(12) United States Patent
    Woldemar (10) Patent No.: US 9,209,670 B2
(45) Date of Patent: Dec. 8, 2015

(54) SPOT WELDS ALIGNING MOTOR COMPONENTS

(71) Applicant: Seagate Technology LLC, Cupertino, CA (US)

(72) Inventor: Chris M. Woldemar, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 72 days.

(21) Appl. No.: 14/018,783

(22) Filed: Sep. 5, 2013

(65) Prior Publication Data

US 2015/0061469 A1    Mar. 5, 2015

(51) Int. Cl.
    *G11B 19/20* (2006.01)
    *H02K 15/14* (2006.01)
    *B23K 37/047* (2006.01)
    *H02K 5/167* (2006.01)

(52) U.S. Cl.
    CPC ............. *H02K 15/14* (2013.01); *B23K 37/047* (2013.01); *H02K 5/1677* (2013.01); *G11B 19/2009* (2013.01); *H02K 2213/09* (2013.01)

(58) Field of Classification Search
    CPC .......... G11B 19/2009; G11B 19/2036; B23K 37/047; B23K 2201/36; B23K 9/007; H02N 1/00; H02K 15/14; H02K 2213/09; H02K 5/1677

USPC .................. 360/99.08; 29/596; 310/67 R, 90
    See application file for complete search history.

(56) References Cited

U.S. PATENT DOCUMENTS

| | | | |
|---|---|---|---|
| 5,529,404 A * | 6/1996 | Robinson et al. ............. 384/617 |
| 5,738,386 A * | 4/1998 | Barefoot et al. ........... 285/284.1 |
| 5,877,571 A | 3/1999 | Brooks |
| 6,034,841 A | 3/2000 | Albrecht et al. |
| 7,908,739 B2 | 3/2011 | Kagata et al. |
| 7,957,092 B2 | 6/2011 | Ichikawa et al. |
| 2003/0066867 A1* | 4/2003 | Lindahl et al. ................ 228/213 |
| 2005/0081384 A1* | 4/2005 | Inoue et al. ................ 29/898.02 |
| 2006/0202577 A1* | 9/2006 | Maekawa et al. ............... 310/90 |
| 2008/0078084 A1* | 4/2008 | Sekii et al. ................. 29/898.02 |
| 2008/0181544 A1* | 7/2008 | Hamada ....................... 384/107 |
| 2009/0108691 A1* | 4/2009 | Yoshikawa ..................... 310/90 |
| 2012/0187789 A1* | 7/2012 | Noh et al. ....................... 310/90 |
| 2014/0293476 A1* | 10/2014 | Choi .............................. 360/75 |

* cited by examiner

*Primary Examiner* — Will J Klimowicz

(57) ABSTRACT

Provided herein, is an apparatus that includes a first weld attaching a first motor component and a second motor component, a second weld attaching the first motor component and the second motor component, and a plurality of spot welds along a joint between the first and second weld wherein the plurality of spot welds are configured to align the first motor component and the second motor component.

12 Claims, 6 Drawing Sheets

SPOT WELDS ALIGNING MOTOR COMPONENTS

BACKGROUND

Data storage disk drives for storage devices (e.g., a hard disk drive) may include a spindle motor for rotationally driving a data storage disk(s). The motor includes a rotor hub, and the data storage disk is arranged on the rotor hub. One exemplary motor bearing mechanism is a hydrodynamic-pressure bearing mechanism. The rotor hub is supported by the hydrodynamic bearing mechanism and rotatable relative to a base of the motor.

In the data storage disk drive, a head assembly accesses positions on the spinning data storage disk by positioning the heads adjacent to the data storage disk. The heads read and/or write information onto the data storage.

SUMMARY

Provided herein, is an apparatus that includes a first weld attaching a first motor component and a second motor component, a second weld attaching the first motor component and the second motor component, and a plurality of spot welds along a joint between the first and second weld wherein the plurality of spot welds are configured to align the first motor component and the second motor component.

These and other features and advantages will be apparent from a reading of the following detailed description.

DRAWINGS

Various embodiments are illustrated by way of example, and not by way of limitation, in the figures of the accompanying drawings and in which like reference numerals refer to similar elements.

DESCRIPTION

Before various embodiments are described in greater detail, it should be understood that the embodiments are not limited to the particular embodiments described and/or illustrated herein, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

An apparatus and method is described herein for embodiments of aligning various motor components in a hard disk drive motor assembly. An initial fitting (e.g. tack welding) of adjacent motor components may result in a misalignment of the motor components. Thereafter, an asymmetrical laser weld, (e.g., seam weld or spot weld), may be applied to the adjacent motor components to correct the misalignment. The adjacent motor components may be configured to be stationary (e.g., a base and a sleeve) with respect to other rotatable components, or rotatable (e.g., a shaft and a hub) with respect to other stationary components.

According to embodiments described herein, an initial fitting or tack welding of the adjacent motor components secures the components together, but may create a sub-optimal alignment of the components. The initial fitting may be, for example, a transition fit that secures a shaft to a hub, yet not so securely that the shaft cannot be disassembled (e.g. disconnected) from the hub. In another example, tack welding may adjoin the adjacent motor components with a number of small welds spaced some distance apart from one another. In various embodiments, tack welding may not allow disassembly of the two motor components. Motor components may also be secured together by other means, all resulting in a sub-optimal alignment of the motor components.

A measurement of the sub-optimal alignment (e.g. offset or misalignment) may then be performed automatically, semi-automatically, and/or manually. For example, system operator or automatic measuring device may measure the misalignment between the two adjacent motor components. Subsequently, after the offset is determined and measured, a seam, or spot weld may be performed to correct the initial offset between the two adjacent components, thereby bringing the two components into a predetermined, optimal, and more stable alignment position. Thus, a motor with the optimally aligned motor parts may benefit from, for example, increased stability, efficiency, functionality, performance, etc.

For example according to various embodiments, the initial fitting or tack welding provides a force sufficient to hold two adjacent motor parts together, yet still allowing the relative positions of the two motor parts to be adjusted with respect to each other. Once the initial measurement of the alignment of the two motor parts has been performed, one or more asymmetrical laser welds, or spot welds, may then be performed at the joint(s) of the two motor parts. Characteristics of the spot weld(s) (e.g. location, size, shape, intensity of the laser, amount of heat generated by the laser, length of time of the laser, etc) are controlled to bring the two parts into a proper and predetermined alignment with one another.

Therefore, the laser weld, or spot weld, may be performed at various locations at the respective joint(s) to correct the initial offset between two components. Offset(s) may be corrected thereby producing a more stable, consistent, and reliable hard disk drive motor system, with optimally aligned motor components.

The various embodiments will now be described in greater detail.

Figure 1:
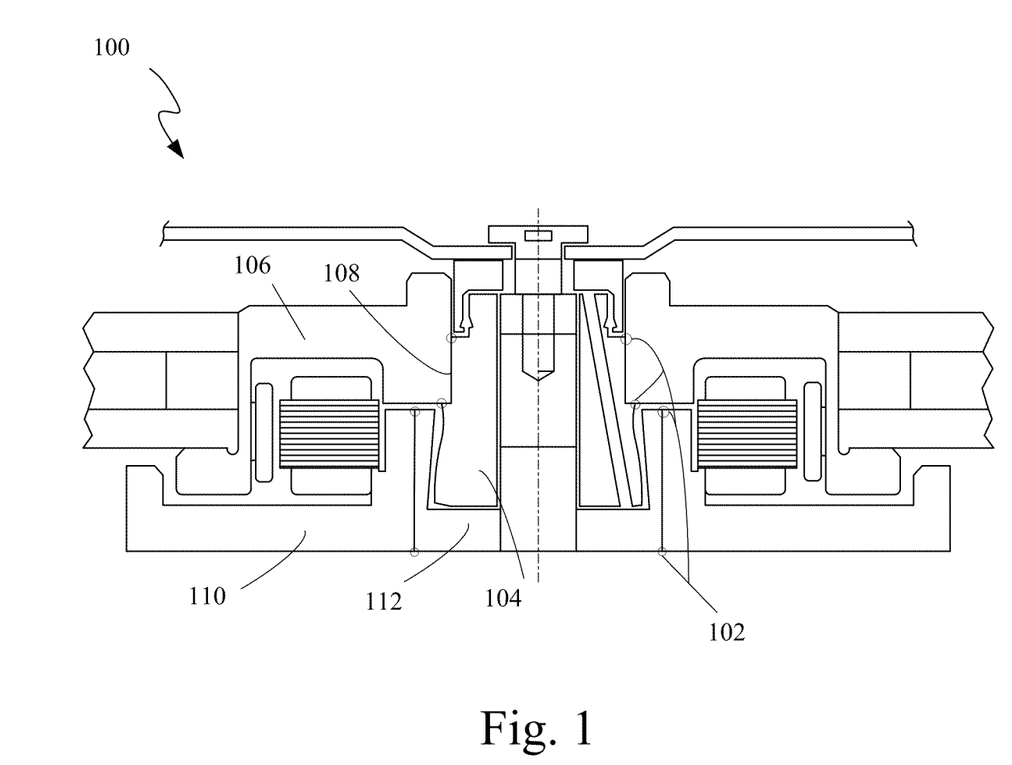
FIG. 1 illustrates a cross sectional view of a fluid dynamic bearing motor with multiple adjacent motor components according to one aspect of the present embodiments.

FIG. 1 illustrates a cross-sectional view of a fluid dynamic bearing motor 100 including adjacent motor components within the motor, wherein the adjacent motor components are initially fitted or tack welded together at a welding joint(s) 102. According to one embodiment, a first motor component (e.g., a sleeve 104) and a second motor component (e.g., a hub 106) may be rotatable with respect to a base 110. The sleeve 104 and the hub 106 may have a coupling interface 108 configured to adjoin the sleeve 104 and the hub 106 at the joint(s) 102. For example, at the coupling interface 108, the sleeve 104 and the hub 106 may be initially fitted, or tack welded, with respect to one another. The initial fitting or tack welding provides a force sufficient to hold the sleeve 104 and the hub 106 together, yet still allowing the relative positions of the sleeve 104 and the hub 106 to be adjusted with respect to one another. The tack weld may produce a sub-optimal alignment position between the sleeve 104 and the hub 106.

Figure 2A:
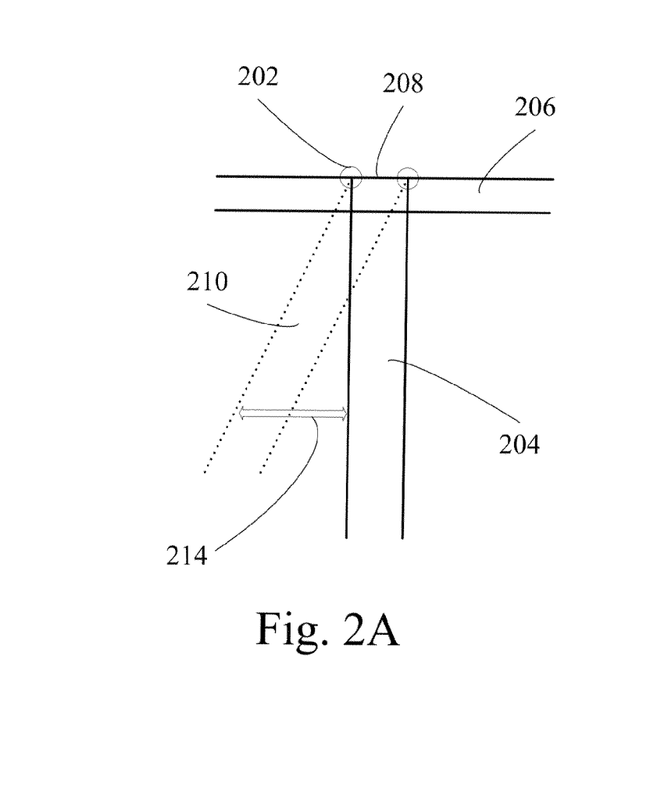
FIG. 2A illustrates a side view of two adjacent motor components according to one aspect of the present embodiments.
Figure 2B:
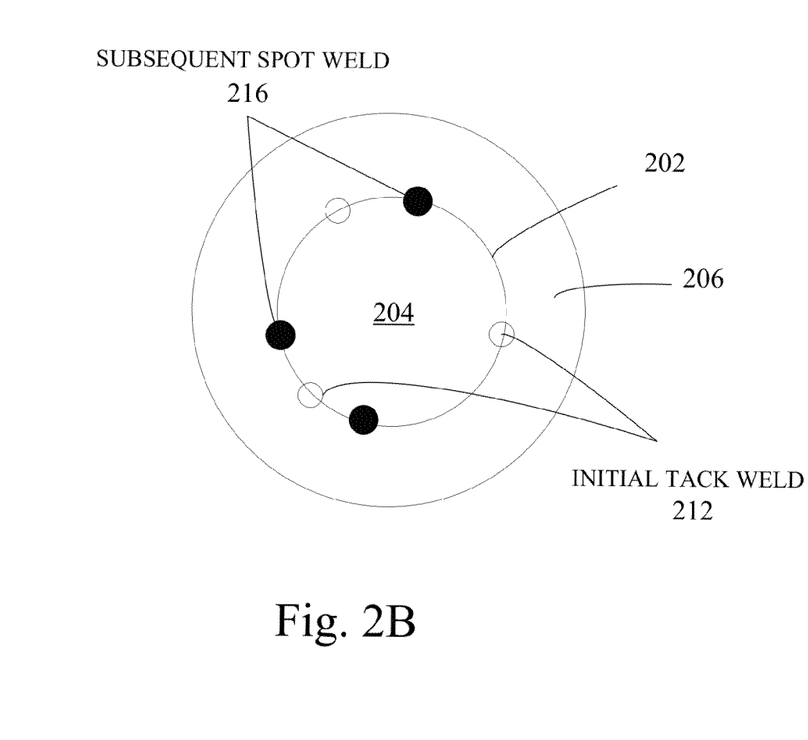
FIG. 2B illustrates a top view of two adjacent motor components according to one aspect of the present embodiments.

In various embodiments, the tack weld may adhere the neighboring motor components with a number of small welds spaced some pre-determined distance apart from one another (FIG. 2A, 2B). The small welds may be spaced at an equal distances apart or varying distances apart from one another along the joint(s) 102 of the interface 108 between the sleeve 104 and the hub 106. Furthermore, the tack weld may or may not allow disassembly of the sleeve 104 from the hub 106. Although, the small welds secure the sleeve 104 and the hub 106 together, they may create a sub-optimal angle and/or alignment of the sleeve 104 and the hub 106.

A measurement of the sub-optimal (offset or misalignment) may then be performed automatically, semi-automatically, and/or manually. For example, a system operator or automatic measuring device may measure the misalignment between the sleeve 104 and the hub 106. Once the offset alignment and/or angle is determined, one or more subsequent asymmetrical laser weld(s) (e.g., a spot or seam weld) may be administered along the joint(s) 102 between the sleeve 104 and hub 106 to correct for any sub-optimal alignment(s).

The spot weld(s) allows complex metals and configurations thereof to be made more structurally sound and stable. Furthermore, the spot weld(s) may bring the sub-optimal alignment between the sleeve 104 and the hub 106 into a predetermined, optimal, and more stable alignment position. In other words, the spot weld(s) corrects the misalignment between the sleeve 104 and the hub 106 with respect to one another. Thus, the sub-optimal alignment generated by the initial fitting, or tack welding, is thereby corrected by the subsequent spot weld(s) performed after the measurement of the offset between the sleeve 104 and hub 106.

Therefore in various embodiments, one or more spot welds may be performed along the joints of motor components (e.g. between the sleeve 104 and the hub 106). The one or more spot welds are configured to align the motor components in a predetermined, optimal, and more stable alignment position while correcting an initial misalignment and offset between the components.

According to some embodiments, multiple welding joints 102 may be present within the fluid dynamic bearing motor. For example, the joints 102 may be positioned between the sleeve 104 and hub 106, wherein the sleeve 104 and the hub 106 are configured for relative rotation with respect to the stationary base 110. Furthermore, the stationary base 110 and a stationary cup 112 may also include welding joints 102. The joints of the stationary and rotatable components are not limited to the examples as illustrated and described herein.

FIG. 2A illustrates a side view and FIG. 2B illustrates a top view of two adjacent motor components coupled to one another. The misalignment illustrated herein is greatly exaggerated for purposes of illustration. According to an embodiment, the two adjacent motor components may include a shaft 204 and a hub 206. As illustrated in FIG. 2, the shaft 204 and hub 206 may be initially aligned or welded together thereby providing a sub-optimal alignment 210 of the two components. This sub-optimal alignment 210 may be created by a tack weld performed along a weld joint(s) 202 at an interface 208 between the hub 206 and shaft 204. This initial tack welding between the shaft 204 and the hub 206 provides a force sufficient to hold the shaft 204 and hub 206 together, yet still allowing the relative positions of the two motor parts to be adjusted with respect to one another.

As further illustrated in FIG. 2B, the initial tack welds 212 at the joints 202 secure the shaft 204 to the hub 206. The initial tack welds 212, according to an exemplary embodiment, may be equally spaced, or evenly distributed along the joints 202 between the shaft 204 and the hub 206. The initial tack welds 212 provide sufficient holding force to keep the shaft 204 and the hub 206 together, while allowing for the alignment between the shaft 204 and the hub 206 to be altered.

As illustrated in FIG. 2A, an alignment measurement will provide a sub-optimal alignment or offset data 214 to a system operator or computer system automatically, semi-automatically, and/or manually. Once the offset data 214 between the shaft 204 and the hub 206 has been recorded, subsequent spot welds 216 may be utilized to bring the shaft 204 and the hub 206 into a predetermined, optimal, and more stable alignment position.

According to another embodiment, a washer, or a ring (not shown), may be welded onto the shaft 204. The washer may be used to provide the initial tack weld(s) 212 to the joint 202 of the interface 208 between the shaft 204 and the hub 206. Again, once the initial tack weld(s) 212 is completed a designer may measure the initial offset 214 between the shaft 204 and the hub 206, wherein the perpendicularity of the hub 206 in respect to the shaft 204 is determined. If the hub 206 is tilted in respect to the shaft 204, a subsequent spot weld(s) 216 may be utilized, at a desired point along the joint(s) 202 between the shaft 204 and hub 206, to bring the two components into a more optimal alignment.

According to yet another embodiment, upon completion of a spot weld, or a series of spot welds 216, the designer may take a second measurement and determine a second offset between the hub 206 and shaft 204. If the two motor components are not at a more optimal and stable alignment position, the system designer may perform one or more subsequent spot weld(s) 216 (e.g. second, third, fourth, etc. spot welds) along the joint(s) 202 to bring the two motor components into the more optimal and stable alignment position. In various embodiments, once a desired alignment and angle are achieved, a finishing seam weld may be performed along the joint(s) 202 between the shaft 204 and hub 206. The seam weld is a weld that may be, for example, configured to encompass the spot welds along a joint(s) 202 to provide a more permanent, predetermined, and optimal alignment position between the shaft 204 and the hub 206.

Figure 3:
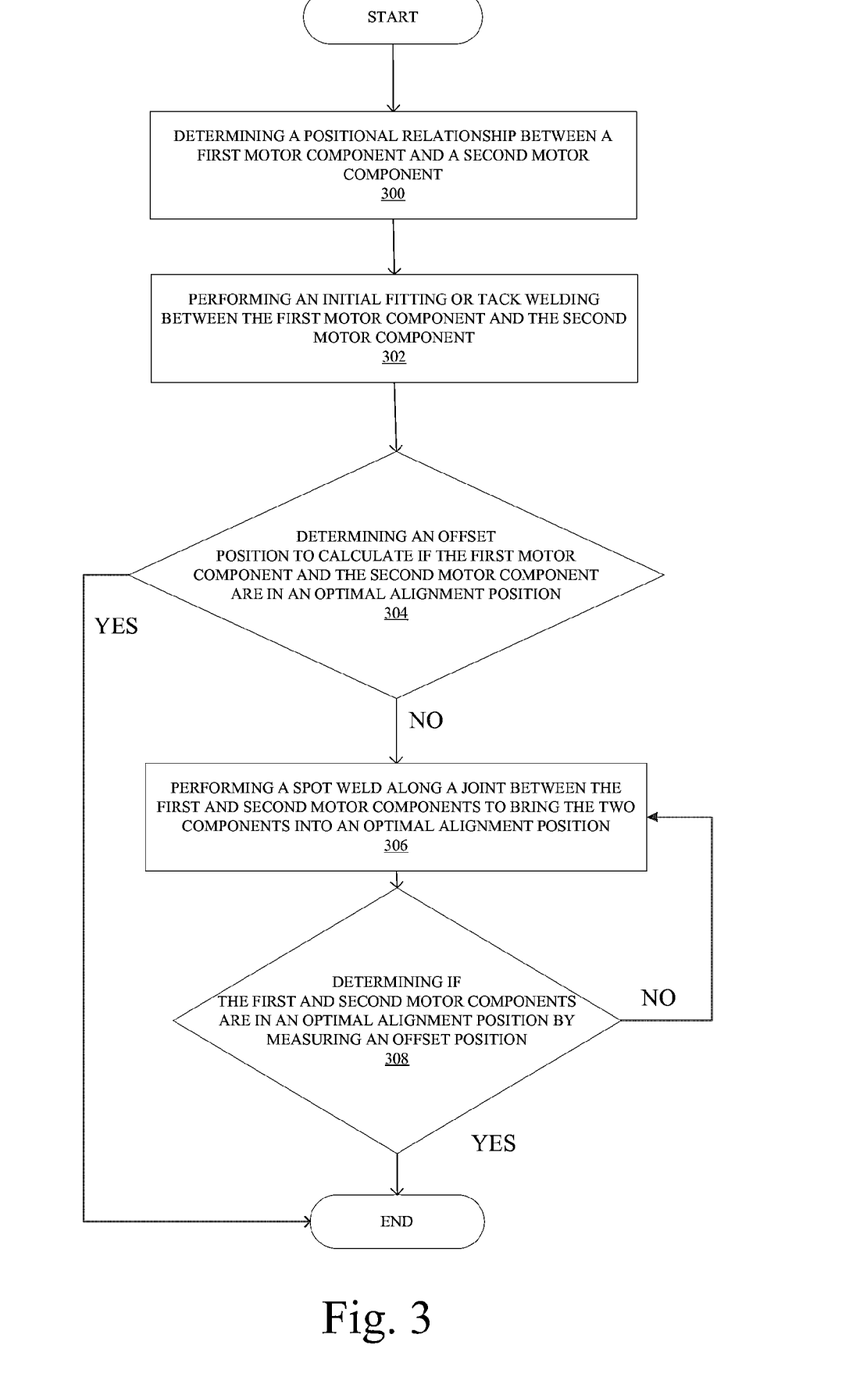
FIG. 3 illustrates a flow chart to align multiple adjacent motor components according to one aspect of the present embodiments.

FIG. 3 illustrates a method to correct a misalignment of two adjacent motor components by utilizing a spot weld(s) along a joint(s) between adjacent motor components. According to an embodiment, in block 300 a positional relationship is determined between the two adjacent motor components. For example, a first component and a second component may be stationary components with respect to one another. The alignment and angular position of the first component with respect to the second component may be determined. The alignment and angular position may be determined automatically, semi-automatically, or manually.

In block 302, an initial fitting or tack welding of the first component and the second component may be performed. The initial tack weld may adjoin the first component and the second component and provide enough force to not allow disassembly of the first component and second component.

In block 304, an offset measurement may be calculated as a result of a sub-optimal alignment position between the first component and the second component. The offset measurement may be used to determine that the first component and the second component are not in an optimal alignment position.

In block 306, one or more subsequent spot welds may be utilized based on the determination and the offset measurement. The one or more subsequent spot welds may be performed along the joint of the first component and the second component. For example, the one or more spot welds may be a single spot weld at one particular position along the joint, or a series of spot welds at multiple positions along the joint between the first component and the second component. Characteristics of the one or more spot welds are controlled to bring the first component and the second component into a proper and predetermined alignment with respect to one another.

In block 308, the offset between the two components is again measured to determine if the first component and the second component are properly aligned (e.g. at a desired angle, optimally positioned with respect to one another, etc.). If the determination is made that the first component and the second component are at an optimal alignment then a seam weld may be performed to implement a permanent sealing of the first component and the second component together. If it is determined that the first component and the second component are not properly aligned, then the steps recited above may be repeated until a proper optimal alignment and/or angle are achieved within the fluid dynamic bearing motor.

According to yet another embodiment, the first component and the second component may also be secured together by other means, also possibly resulting in a sub-optimal alignment of the motor components. However, the offset measurement is not limited to the components described in the aforementioned paragraphs, in fact, the offset measurement may be performed between any two adjacent components within the motor system that are being welded together.

Figures 4A, 4B:
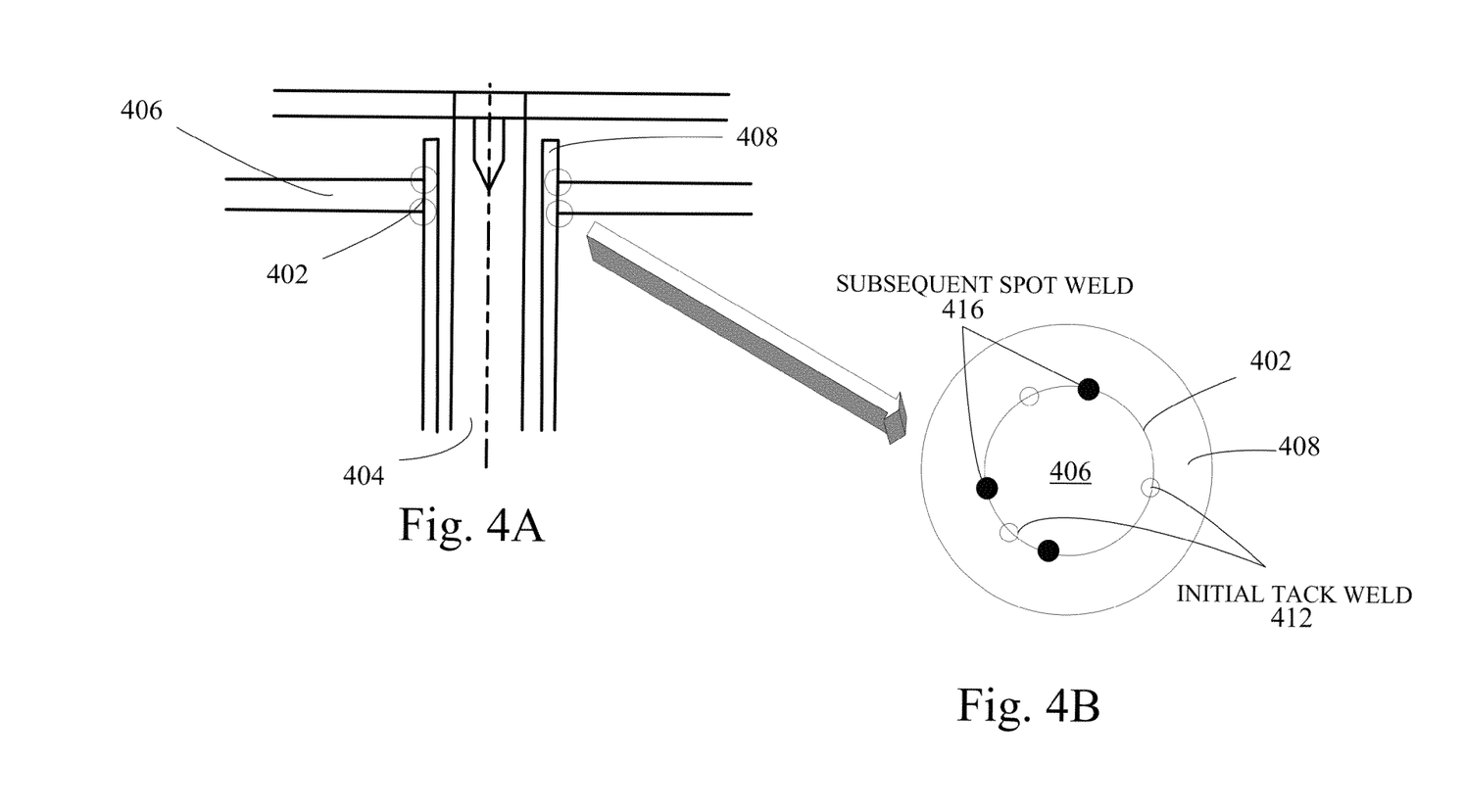
FIG. 4A illustrates a side view of a rotatable thrust plate and sleeve configuration according to one aspect of the present embodiments.
FIG. 4B illustrates a top view of a rotatable thrust plate and sleeve configuration according to one aspect of the present embodiments.
Figure 5A:
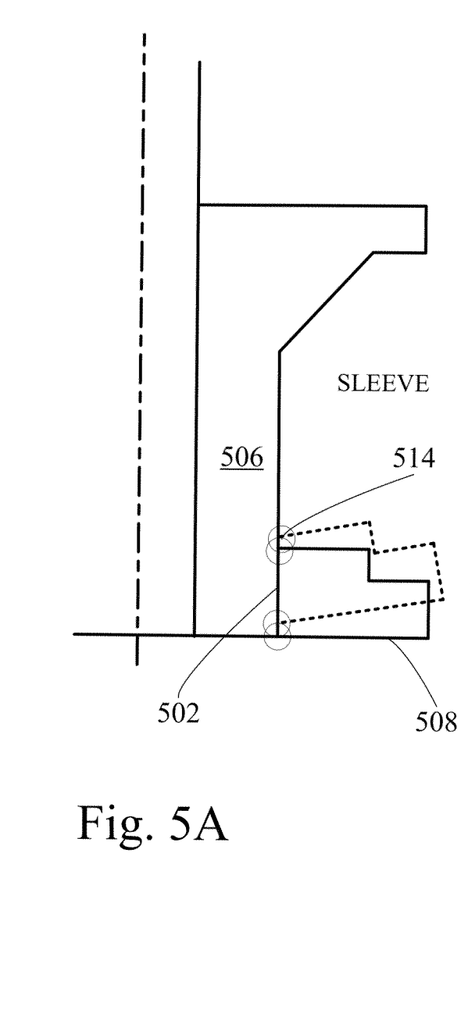
FIG. 5A illustrates a side view of a stationary sleeve and base configuration according to one aspect of the present embodiments.
Figure 5B:
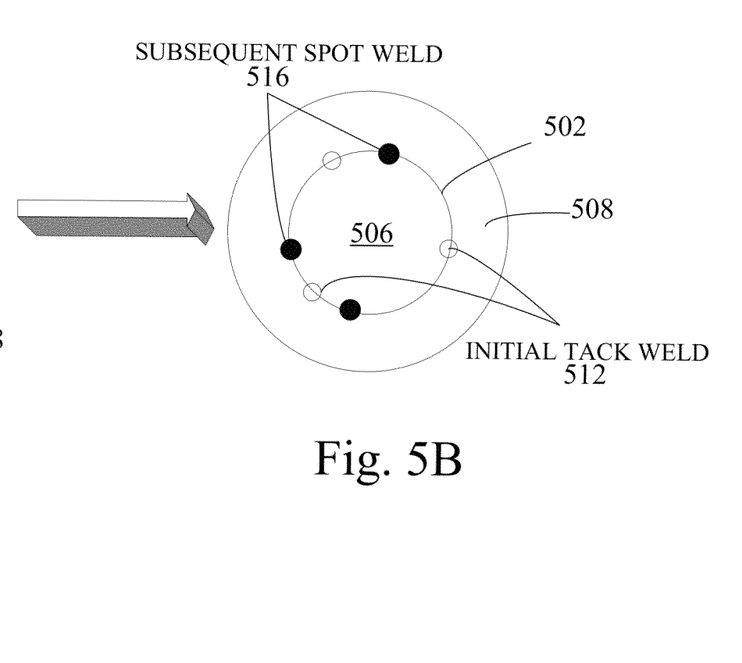
FIG. 5B illustrates a top view of a stationary sleeve and base configuration according to one aspect of the present embodiments.

FIGS. 4A and 5A, illustrate various adjacent motor components aligned with respect to one another according to various embodiments. FIGS. 4B and 5B further illustrate a magnified representative section of a joint interface between two adjacent motor components. As previously described above, the initial fitting (tack welding, press fitting, gluing, bonding, etc.) may be performed on one or more sets of adjacent stationary components and/or one or more sets of adjacent rotatable components within the motor.

For example, FIGS. 4A and 4B illustrates a hub 406 and a sleeve 408 configured for relative rotation with respect to a stationary shaft 404. The joint interface(s) 402 may be tack welded 412 together, and the offset between the hub 406 and the sleeve 408 is measured. Once the offset is determined, a subsequent spot weld 416 may occur along the joint(s) 402 between the thrust plate 406 and the sleeve 408. FIG. 4B illustrates a magnified representative view of the joint 402 whereby the tack welds 412 and subsequent spot welds 416 are utilized.

According to another embodiment, FIGS. 5A and 5B illustrate a stationary sleeve 506 and base 508 with respect to a rotatable hub (not shown). The base 508 may be positioned adjacent to the sleeve 506, and then initial tack welds 512 applied to provide a joint strength sufficient to prevent disassembly of the sleeve 506 and base 508. Thereafter, an initial offset 514 may be determined, and a subsequent spot weld 516 performed along the joint 502 between the base 508 and sleeve 506. FIG. 5B illustrates a magnified representative view of the joint 502 with the initial tack welds 512 and the subsequent spot welds 516, thereby providing a predetermined, optimal alignment position.

According to another embodiment, adjacent motor components may be initially slip-fit together, or adhesively coupled together to provide an initial holding alignment. Thereafter, an initial offset position may be determined between the motor components and subsequent spot weld(s) may be performed along the joint(s) between the motor components. In further embodiments, the adjacent components may be press-fitted together to perform the initial coupling between the components. Thereafter, the adjacent components are spot welded together, thus achieving a predetermined optimal alignment.

Figure 6:
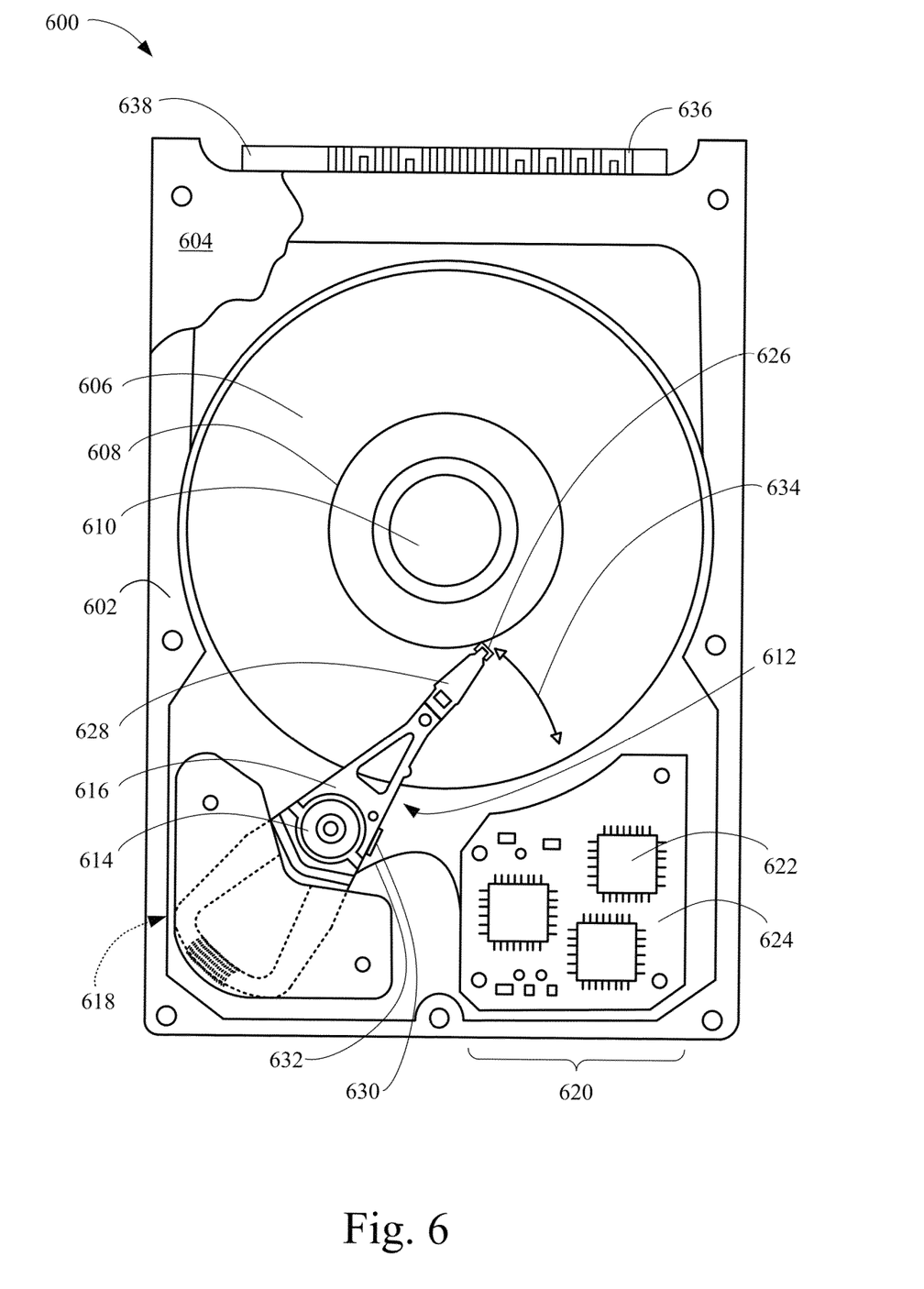
FIG. 6 illustrates a plan view of a data storage device, according to one aspect of the present embodiments.

FIG. 6 is a plan view of a data storage device in which an asymmetrical laser weld, or spot weld described herein may be used. In particular, two adjacent components within the data storage device may be coupled together (by an initial weld, slip fit, glue, etc.) and a subsequent spot weld occurs thereafter to bring the two adjacent components into an optimal or desired alignment position.

A disk drive 600 generally includes a base plate 602 and a top cover 604 that may be disposed on the base plate 602 to define an enclosed housing for various disk drive components. The disk drive 600 includes one or more data storage disks 606 of computer-readable data storage media. Typically, both of the major surfaces of each data storage disk 606 include a plurality of concentrically disposed tracks for data storage purposes. Each data storage disk 606 is mounted on a hub 608, which in turn is rotatably interconnected with the base plate 602 and/or cover 604. In various embodiments, the hub 608 may be attached to a rotating shaft (not shown) or a rotating sleeve (not shown) along a joint. The joint may include one or more spot welds that were applied to align the hub 608 to the rotating shaft or the rotating sleeve. Multiple data storage disks 606 are typically mounted in vertically spaced and parallel relation on the hub 608. A spindle motor 610 rotates the data storage disks 606.

The disk drive 600 also includes an actuator arm assembly 612 that pivots about a pivot bearing 614, which in turn is rotatably supported by the base plate 602 and/or cover 604. The actuator arm assembly 612 includes one or more individual rigid actuator arms 616 that extend out from near the pivot bearing 614. Multiple actuator arms 616 are typically disposed in vertically spaced relation, with one actuator arm 616 being provided for each major data storage surface of each data storage disk 606 of the disk drive 600. Movement of the actuator arm assembly 612 is provided by an actuator arm drive assembly, such as a voice coil motor 618 or the like. The voice coil motor 618 is a magnetic assembly that controls the operation of the actuator arm assembly 612 under the direction of control electronics 620.

The control electronics 620 may include a plurality of integrated circuits 622 coupled to a printed circuit board 624. The control electronics 620 may be coupled to the voice coil motor assembly 618, a slider 626, or the spindle motor 610 using interconnects that can include pins, cables, or wires (not shown).

A load beam or suspension 628 is attached to the free end of each actuator arm 616 and cantilevers therefrom. Typically, the suspension 628 is biased generally toward its corresponding data storage disk 606 by a spring-like force. The slider 626 is disposed at or near the free end of each suspension 628. The read/write head (e.g., transducer) is appropriately mounted as a head unit (not shown) under the slider 626 and is used in disk drive read/write operations. The head unit under the slider 626 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 626 is connected to a preamplifier 630, which is interconnected with the control electronics 620 of the disk drive 600 by a flex cable 632 that may be mounted on the actuator arm assembly 612. Signals are exchanged between the head unit and its corresponding data storage disk 606 for disk drive read/write operations. In this regard, the voice coil motor 618 is utilized to pivot the actuator arm assembly 612 to simultaneously move the slider 626 along a path 634 and across the corresponding data storage disk 606 to position the head unit at the appropriate position on the data storage disk 606 for disk drive read/write operations.

When the disk drive 600 is not in operation, the actuator arm assembly 612 is pivoted to a "parked position" to dispose each slider 626 generally at or beyond a perimeter of its corresponding data storage disk 606, but in any case in vertically spaced relation to its corresponding data storage disk 606. In this regard, the disk drive 600 includes a ramp assembly (not shown) that is disposed beyond a perimeter of the data storage disk 606 to both move the corresponding slider 626 vertically away from its corresponding data storage disk 606 and to also exert somewhat of a retaining force on the actuator arm assembly 612.

Exposed contacts 636 of a drive connector 638 along a side end of the disk drive 600 may be used to provide connectivity between circuitry of the disk drive 600 and a next level of integration such as an interposer, a circuit board, a cable connector, or an electronic assembly. The drive connector 638 may include jumpers (not shown) or switches (not shown) that may be used to configure the disk drive 600 for user specific features or configurations. The jumpers or switches may be recessed and exposed from within the drive connector 638.

Thus, as provided herein, is an apparatus that includes a first weld attaching a first motor component and a second motor component, a second weld attaching the first motor component and the second motor component, and a plurality of spot welds along a joint between the first and second weld wherein the plurality of spot welds are configured to align the first motor component and the second motor component.

In some embodiments, the joint is positioned at an interface between the first and second motor components. In some embodiments, the plurality of welds are configured to change an initial alignment of the first and second motor components, wherein the initial alignment was created by the first or second weld. In some embodiments, the alignment is substantially fixed by the spot welds. In some embodiments, the alignment is a predetermined alignment. In some embodiments, the apparatus further includes, a third weld attaching the first motor component to the second motor component. In some embodiments, the first and second motor components are configured to be stationary components with respect to a rotating hub. In some embodiments, the first and second motor components are configured to be rotatable components with respect to a stationary base.

Also provided herein is a method, including tack welding a first motor component and a second motor component, determining a first offset between the first motor component and the second motor component, and spot welding along a joint to correct the first offset between the first and second motor components.

In some embodiments, the joint is positioned at an interface between the first and second motor components. In some embodiments, the method further includes, determining a second offset between the first and second motor components; and spot welding along the joint to correct the second offset between the first and second motor components. In some embodiments, the method further includes, generating plurality of spot welds configured to change in initial alignment of the first and second motor components, wherein the initial alignment was created by the tack weld. In some embodiments, the first and second motor components are configured to be stationary components with respect to a rotating hub. In some embodiments, the first and second motor components are configured to be rotatable components with respect to a stationary base.

Also provided herein is an apparatus, including a first motor component, a second motor component secured to the first motor component along a joint; and a spot weld on the joint, wherein the spot weld is configured to align the first motor component to the second motor component.

In some embodiments, the joint is positioned at an interface between the first motor component and the second motor component. In some embodiment, the apparatus further includes a plurality of spot welds configured to change an initial alignment of the first and second motor components, wherein the initial alignment was created by the tack weld. In some embodiments, the initial alignment is substantially fixed by the plurality of spot welds. In some embodiments, the first and second motor components are configured to be stationary components with respect to a rotating hub. In some embodiments, the first and second motor components are configured to be rotatable components with respect to a stationary base.

While embodiments have been described and/or illustrated by means of examples, and while these embodiments and/or examples have been described in considerable detail, it is not the intention of the applicant(s) to restrict or in any way limit the scope of the embodiments to such detail. Additional adaptations and/or modifications of the embodiments may readily appear in light of the described embodiments, and, in its broader aspects, the embodiments may encompass these adaptations and/or modifications. Accordingly, departures may be made from the foregoing embodiments and/or examples without departing from the scope of the embodiments. The implementations described above and other implementations are within the scope of the following claims.

What is claimed is:

1. An apparatus comprising:
   a first weld attaching a first motor component to a second motor component;
   a second weld attaching the first motor component to the second motor component, wherein the first weld and the second weld provide a force sufficient to hold the first motor component and the second motor component together while allowing for relative movement; and
   a plurality of spot welds along a joint between the first weld and the second weld wherein the plurality of spot welds are configured to align the first motor component and the second motor component; the plurality of spot welds are configured to change an initial alignment of the first and second motor components, wherein the initial alignment was created by the first or second weld, wherein the alignment is substantially fixed by the spot welds.

2. The apparatus of claim 1, wherein the joint is positioned at an interface between the first and second motor components.

3. The apparatus of claim 1, wherein the alignment is a predetermined alignment.

4. The apparatus of claim 1, further includes:
   a third weld attaching the first motor component to the second motor component.

5. The apparatus of claim 1, wherein the first and second motor components are configured to be stationary components with respect to a rotating hub.

6. The apparatus of claim 1, wherein the first and second motor components are configured to be rotatable components with respect to a stationary base.

7. An apparatus comprising:
   a first motor component;
   a second motor component secured to the first motor component along a joint;
   a plurality of tack welds along the joint wherein the plurality of tack welds provides a force sufficient to hold the first motor component and the second motor component together while allowing for relative movement; and
   a spot weld on the joint wherein the spot weld is configured to align the first motor component and the second motor component; the spot weld is configured to change an initial alignment of the first and second motor components, wherein the initial alignment was created by plurality of tack welds, wherein the alignment is substantially fixed by the spot weld.

8. The apparatus of claim 7, wherein the joint is positioned at an interface between the first motor component and the second motor component.

9. The apparatus of claim 7, further includes:
   a plurality of spot welds configured to change an initial alignment of the first and second motor components, wherein the initial alignment was created by the plurality of tack welds.

10. The apparatus of claim 9, wherein the initial alignment is substantially fixed by the plurality of spot welds.

11. The apparatus of claim 7, wherein the first and second motor components are configured to be stationary components with respect to a rotating hub.

12. The apparatus of claim 7, wherein the first and second motor components are configured to be rotatable components with respect to a stationary base.

* * * * *